(12) United States Patent
Saito et al.

(10) Patent No.: US 6,765,750 B2
(45) Date of Patent: Jul. 20, 2004

(54) TAPE LOADING DEVICE

(75) Inventors: Yoshiyuki Saito, Osaka (JP); Akio Konishi, Hyogo (JP); Koichiro Hirabayashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 225 days.

(21) Appl. No.: 10/147,566

(22) Filed: May 16, 2002

(65) Prior Publication Data

US 2002/0176203 A1 Nov. 28, 2002

(30) Foreign Application Priority Data

May 25, 2001 (JP) ........................................ 2001-156553

(51) Int. Cl.⁷ .............................................. G11B 15/60
(52) U.S. Cl. ................................... 360/85; 360/130.21
(58) Field of Search ............. 360/85, 84, 130.1–130.33

(56) References Cited

U.S. PATENT DOCUMENTS

| | | | | |
|---|---|---|---|---|
| 4,616,274 A | * | 10/1986 | Nagaoka | 360/71 |
| 5,025,333 A | * | 6/1991 | Feinberg et al. | 360/85 |
| 5,949,609 A | * | 9/1999 | Hashimoto et al. | 360/85 |
| 2002/0176204 A1 | * | 11/2002 | Saito et al. | 360/85 |

FOREIGN PATENT DOCUMENTS

| | | | | |
|---|---|---|---|---|
| JP | 01302568 A | * | 12/1989 | G11B/15/665 |
| JP | 06243559 A | * | 9/1994 | G11B/15/665 |
| JP | 06302063 A | * | 10/1994 | G11B/15/60 |
| JP | 11219554 A | * | 8/1999 | G11B/15/61 |

* cited by examiner

*Primary Examiner*—William Klimowicz
(74) *Attorney, Agent, or Firm*—Renner, Otto, Boisselle & Sklar, LLP

(57) ABSTRACT

A tape loading device for loading a tape from a first state, in which the tape is mounted on a chassis, to a second state, in which a tape running path is formed as a result of a tape guide post pulling out and winding the tape at a prescribed position is provided. The tape loading device includes a transportation member having the tape guide post thereon; a forward wall integrated with the transportation member and disposed rearward to the tape guide post and inclined so that normal thereto is directed forward and obliquely upward; and a pressure-contact member, which is in pressure-contact with the forward wall in the second state, for urging the transportation member forward and obliquely upward.

4 Claims, 18 Drawing Sheets

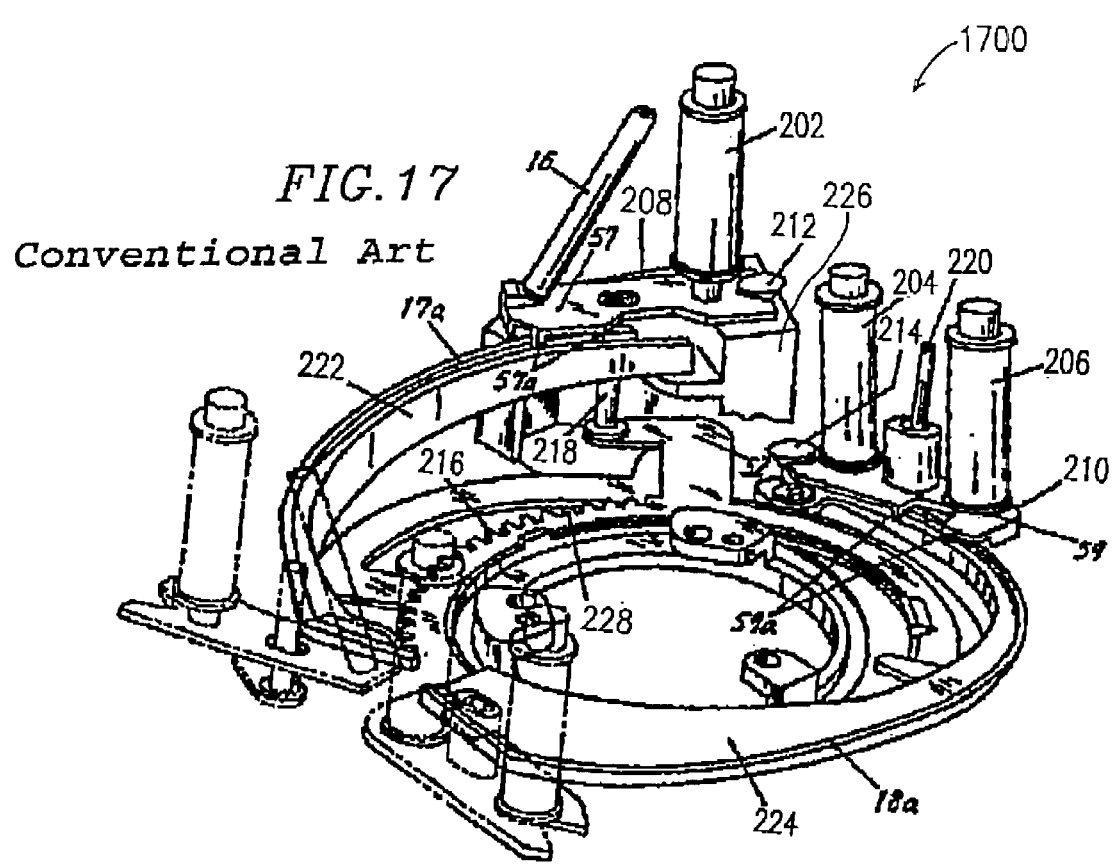

TAPE LOADING DEVICE

BACKGROUND OF THE INVENTION

1. Field of the Invention

The present invention relates to a tape loading apparatus used for a magnetic recording and reproduction apparatus.

2. Description of the Related Art

According to a general tape loading mechanism used in a conventional magnetic recording and reproduction apparatus, a tape is pulled out from a tape cassette and wound around a rotational head cylinder. Transportation members and tape guide posts are positioned as follows.

First, the transportation members having the tape guide posts projecting therefrom are transferred and positioned by a plurality of links or arms, which are pivotally engaged with a pivoting shaft of each transportation member.

Then, the tape guide posts, which are provided on the transportation members with a high level of precision, are positioned by putting the transportation members into pressure-contact with positioning members provided on the chassis by a separate pressure-contact device. In this manner, the positions of the tape guide posts in the planar direction and in the height direction, and the angle of inclination of the tape guide posts are determined.

A tape loading mechanism of a conventional magnetic recording and reproduction apparatus will be described.

First, a conventional transportation mechanism for transporting transportation members to prescribed positions will be described. FIG. 12 is a plan view of a magnetic recording and reproduction apparatus 1200 described in Japanese Laid-Open Publication No. 11-273191. In FIG. 12, a tape 2 is not yet loaded.

An S (supply-side) boat 39 and a T (takeup-side) boat 40 each serve as a tape drawing member provided on a main chassis 8. Pins 41A and 41B provided on the S boat 39, and pins 41C and 41D provided on the T boat 40, are in engagement with a long hole 43 of a rail 42. The S boat 39 and the T boat 40 move along the long hole 43. An S2 post 44 and an S1 post 45 are provided on the S boat 39, and a T1 post 46 and a T2 post 47 are provided on the T boat 40. As the S boat 39 and the T boat 40 move, the posts 44, 45, 46 and 47 act to wind the tape 2 around a rotational head cylinder 38. Reference numeral 48 is a rail section provided on the main chassis 8.

FIG. 13 is another plan view of the tape loading mechanism 1200. FIG. 13 shows a portion of the tape loading mechanism 1200 which is on the main chassis 8. FIG. 14 is an enlarged view of the S boat 39 and the T boat 40. In FIGS. 13 and 14, a boat driving arm 73 is supported on the main chassis 8 by a shaft 74. A driving pin 75 standing on a cam gear 66 contacts an inner cam 76 provided on the boat driving arm 73. Thus, the boat driving arm 73 is driven by a pivoting movement of the cam gear 66.

A gear 77 of the boat driving arm 73 is in engagement with a pinion 80 integrated with an S load gear 79, which is supported on the main chassis 8 by a shaft 78.

An S load arm 81 is coaxially supported with the S load gear 79. An S load link 82 is attached to the S load arm 81 via a shaft 83 so that the S load link 82 is rotatable with respect to the S load arm 81. The S load link 82 is also attached to the S boat 39 via a pin 41A so that the S load link 82 is rotatable with respect to the S boat 39.

A T load gear 84 is supported on the main chassis 8 by a shaft 85 and is engaged with the S load gear 79. A T load arm 86 is coaxially supported with the T load gear 84. A T load link 87 is attached to the T load arm 86 via a shaft 88 so that the T load link 87 is rotatable with respect to the T load arm 86. The T load link 87 is also attached to the T boat 40 via a pin 41C so that the T load link 87 is rotatable with respect to the T boat 40.

The S load arm 81 and the S load gear 79 are usually integrated together with a twisted coil spring (not shown) and are pivoted about the shaft 78. The S load gear 79, when rotated clockwise while the S load arm 81 is stopped, is urged counterclockwise by the twisted coil spring. Likewise, the T load arm 86 and the T load gear 84 are usually integrated together with a twisted coil spring (not shown) and are pivoted about the shaft 85. The T load gear 84, when rotated counterclockwise while the T load arm 86 is stopped, is urged clockwise by the twisted coil spring.

The S load gear 79 and the T load gear 84 are driven by a pivoting movement of the boat driving arm 73, and thus the S boat 39 and the T boat 40 move on the rail 42 (FIG. 12) via the S load link 82 and the T load link 87.

FIG. 15 is a plan view of the magnetic recording and reproduction apparatus 1200 when the tape 2 is loaded. FIG. 16 shows the boat driving arm 73 when the tape 2 is loaded.

The boat driving arm 73 has been rotated at a maximum possible angle counterclockwise. The S boat 39 and the T boat 40 each have moved to a prescribed position on the main chassis 8 via the gear 77, the S load gear 79, and the T load gear 84. A V-shaped edge 143 of the S boat 39 contacts a boat stopper 141 provided on the main chassis 8, and a V-shaped edge 144 of the T boat 40 contacts a boat stopper 142 also provided on the main chassis 8. Thus, the S boat 39 and the T boat 40 are positioned. The S load gear 79 and the S load arm 81 are integrally rotated while the S boat 39 is moving. The T load gear 84 and the T load arm 86 are integrally rotated while the e boat 40 is moving. The S link 82 and the S load arm 81 are structured so that the S boat 39 reaches a prescribed position in a certain mode, and the T link 87 and the T load arm 86 are structured so that the T boat 40 reaches a prescribed position in the mode. The boat driving arm 73 rotates the S load gear 79 clockwise and rotates the T load gear 84 counterclockwise, both beyond the prescribed positions. Therefore, a rotation phase difference is generated between the S load gear 79 and the S load arm 81 and between the T load gear 84 and the T load arm 86. Therefore, the S boat 39 is put into pressure-contact with the boat stopper 141 by a reaction force of a twisted coil spring (not shown), and the T boat 40 is put into pressure-contact with the boat stopper 142 by a reaction force of a twisted coil spring (not shown).

Next, a method for positioning tape guide roller posts provided in the transportation members will be described. FIG. 17 is a partial perspective view of a tape loading mechanism 1700 of a magnetic recording and reproduction apparatus described in Japanese Laid-Open Publication No. 4-318361.

The tape loading mechanism 1700 includes tape guide roller posts 202, 204 and 206. The tape guide roller post 202 is provided on a boat 208, and the tape guide roller posts 204 and 206 are provided on a boat 210. Stoppers 212 and 214 are provided on a chassis 226. The loading mechanism 1700 further includes a supply-side loading ring gear 216 (for a takeup-side loading ring gear, see FIG. 6 of Japanese Laid-Open Publication No. 4-318361), a supply-side driving shaft 218 provided on the supply-side loading ring gear 216, a takeup-side driving shaft 220 provided on the takeup-side loading ring gear, a supply-side loading guide 222, and a takeup-side loading guide 224.

The supply-side loading ring gear 216 is rotated by a separate driving element, and the takeup-side loading ring gear is rotated by a separate driving element. Thus, the boats 208 and 210, which are respectively engaged with the feed-side driving loading ring gear 216 and the takeup-side loading ring gear, load a tape (not shown) along the loading guides 222 and 224 from a tape cassette. When the loading of the tape is completed, the boats 208 and 210 are respectively put into pressure-contact with the stoppers 212 and 214. Thus, the tape guide roller posts 202, 204 and 206 are positioned.

FIGS. 18A through 18D show a positioning mechanism for positioning the supply-side boat 208 (referred to as the "boat 208"). FIG. 18A is a plan view of the boat 208, FIG. 18B is a side view thereof, FIG. 18C is a bottom view thereof, and FIG. 18D is a partial cross-sectional view thereof taken along line T—T of FIG. 18A. For sake of simplicity, the structure of each element of the boat 208 and the positioning mechanism has been simplified.

Reference numeral 486 represents a stopper projecting from the chassis 226 (FIG. 17). A conical pressing portion 486b is provided on a pin 486a. Reference numeral 464a represents a V-shaped groove provided at a front end of the boat 208. The V-shaped groove 464a has an inclining portion. A reference surface is provided each at the front end (left end in FIGS. 18A through 18C) and a rear end (right end in FIGS. 18A through 18C) of the boat 208. The reference surfaces contact the reference surface of the chassis 226 which is disposed in the vicinity of the boat 208 in a state where the tape is completely loaded (loading completion state). In this manner, highly precise positioning of the boat 208 is provided.

As shown in FIGS. 17 and 18A though 18D, the boat 208 is guided along the supply-side loading guide 222 as the supply-side ring gear 228 pivots. The stopper 486 contacts the V-shaped groove 464a in the loading completion state. Thus, the boat 208 is positioned. In the loading completion state, a driving force is maintained in the direction of arrow J (FIG. 18B) via the supply-side driving shaft 218 by a separate driving element (a swinging plate 45 in Japanese Laid-Open Publication No. 4-318361; not shown here). Therefore, when the stopper 486 contacts the V-shaped groove 464a, the V-shaped groove 464a regulates the position of the boat 208 in the horizontal direction in FIGS. 18A through 18D. Since a force is also maintained upon the boat 208 in the direction of arrow K (FIG. 18B), the position of the boat 208 is also regulated in the vertical direction in FIGS. 18A through 18D.

The above-described conventional devices have the following problems.

In the loading mechanism 1200 described in Japanese Laid-Open Publication No. 11-273191, pivoting shafts are required to convey the force from the loading gears 79 and 84 to the boats 39 and 40. This increases the number of elements.

In the positioning mechanism described in Japanese Laid-Open Publication No. 4-318361, the positions and angles of inclination of the tape guide roller posts 202, 204 and 206 are determined by positioning the boats 208 and 210 with respect to the chassis 226. Due to such a construction, it is necessary to guarantee a very high level of precision as to the angle of inclination of the tape guide roller posts 202, 204 and 206 with respect to the reference surfaces of the boats 208 and 210. This requires the shape of the boats 208 and 210 to be extremely precise and complicated, and thus increases the production cost of the boats 208 and 210. An error in the angle of inclination and position of the tape guide roller posts 202, 204 and 206 with respect to the boats 208 and 210 can undesirably cause abnormal running of the tape and damage the tape.

As described above, the conventional art requires a large number of elements and a high level of precision of each element, This increases the cost of the loading and positioning mechanisms and makes it difficult to guarantee the required level of quality.

SUMMARY OF THE INVENTION

A tape loading device for loading a tape from a first state, in which the tape is mounted on a chassis, to a second state, in which a tape running path is formed as a result of a tape guide post pulling out and winding the tape at a prescribed position is provided. The tape loading device includes a transportation member having the tape guide post thereon; a forward wall integrated with the transportation member and disposed rearward to the tape guide post and inclined so that normal thereto is directed forward and obliquely upward; and a pressure-contact member, which is in pressure-contact with the forward wall in the second state for urging the transportation member forward and obliquely upward.

In one embodiment of the invention, the tape loading device further includes a rear wall integrated with the transportation member and provided rearward to the front wall, wherein during a loading operation for transferring from the first state into the second state, the pressure-contact member presses the front wall to drive the transportation member forward, and during an unloading operation for transferring from the second state into the first state, the pressure-contact member presses the rear wall to drive the transportation member rearward.

In one embodiment of the invention, the tape loading device further includes an upper stopping member provided above the tape; a lower stopping member provided below the tape; and a height stopping member. In the second state, an upper portion of the tape guide post contacts the upper stopping member so as to determine a position of the upper portion of the tape guide post in a planar direction, a lower portion of the tape guide post or a portion of the transportation member contacts the lower stopping member so as to determine a position of the lower portion of the tape guide post in the planar direction, and a portion of the tape guide post or a portion of the transportation member contacts the height stopping member so as to determine a position of the tape guide post in a height direction.

In one embodiment of the invention, the tape guide post includes a roller shaft; a roller rotatably supported by the roller shaft; an upper flange integrated with the roller shaft for restricting an upward movement of the roller; a lower flange integrated with the roller shaft for restricting a downward movement of the roller. A portion of the roller shaft which passes through the upper flange and projects upward from the upper flange is defined as an upper roller shaft portion, and a portion of the roller shaft which passes through the lower flange and projects downward from the lower flange is defined as a lower roller shaft portion. The upper roller shaft portion contacts the upper stopping member, the lower roller shaft portion contacts the lower stopping member, and a top surface of the upper roller shaft portion contacts the height stopping member.

Thus, the invention described herein makes possible the advantages of providing a tape loading device which includes fewer elements, with a simpler structure, and thus is lower-cost while providing stable performance.

These and other advantages of the present invention will become apparent to those skilled in the art upon reading and understanding the following detailed description with reference to the accompanying figures.

BRIEF DESCRIPTION OF THE DRAWINGS

FIG. 17 is a partial perspective view of a tape loading mechanism of another conventional magnetic recording and reproduction apparatus.

DESCRIPTION OF THE PREFERRED EMBODIMENTS

Figure 1:
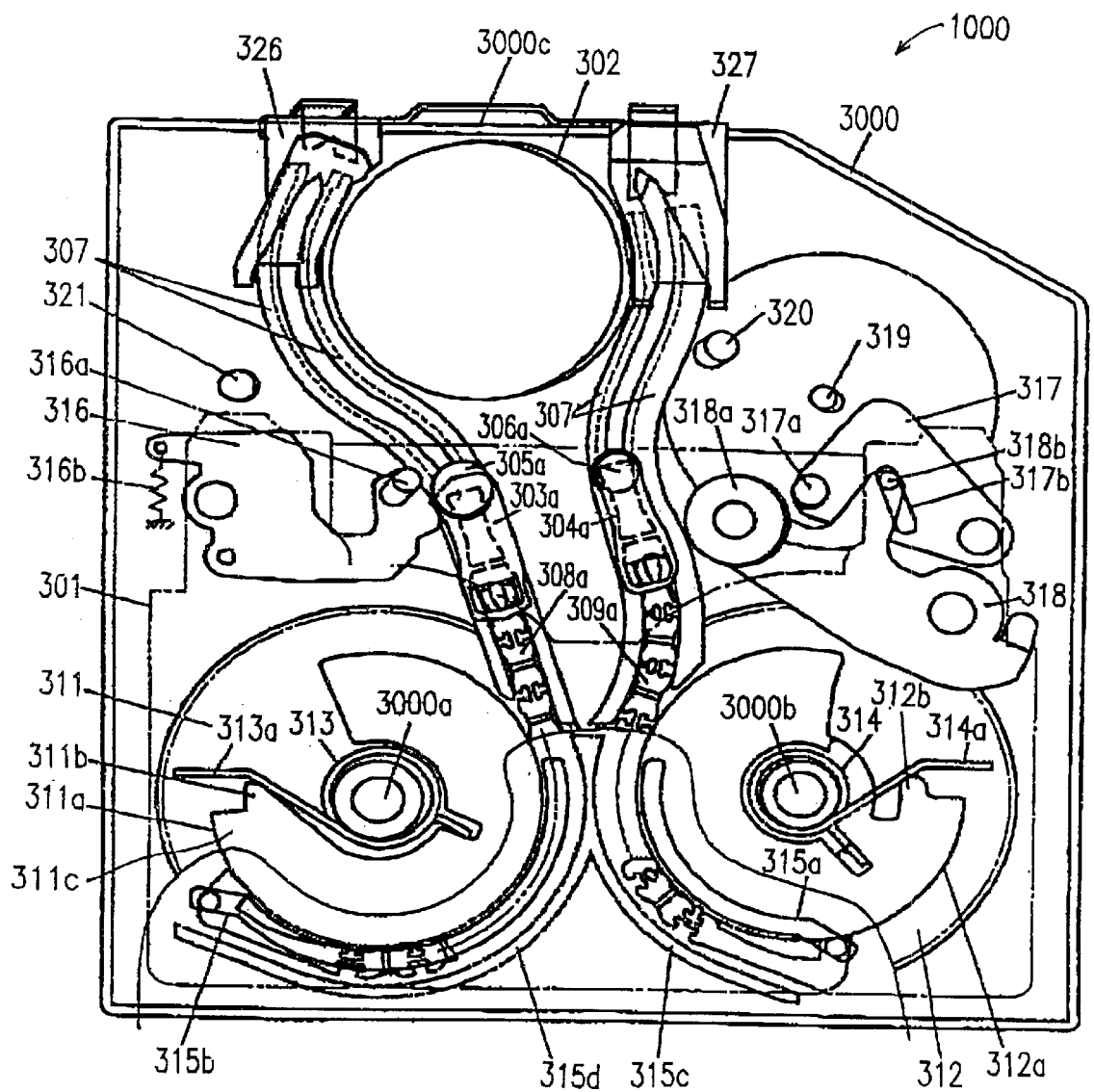
FIG. 1 is a plan view of a tape loading device according to an example of the present invention.

Hereinafter, the present invention will be described by way of illustrative examples with reference to the accompanying drawings. Identical elements in different examples bear identical reference numerals.

Figure 2:
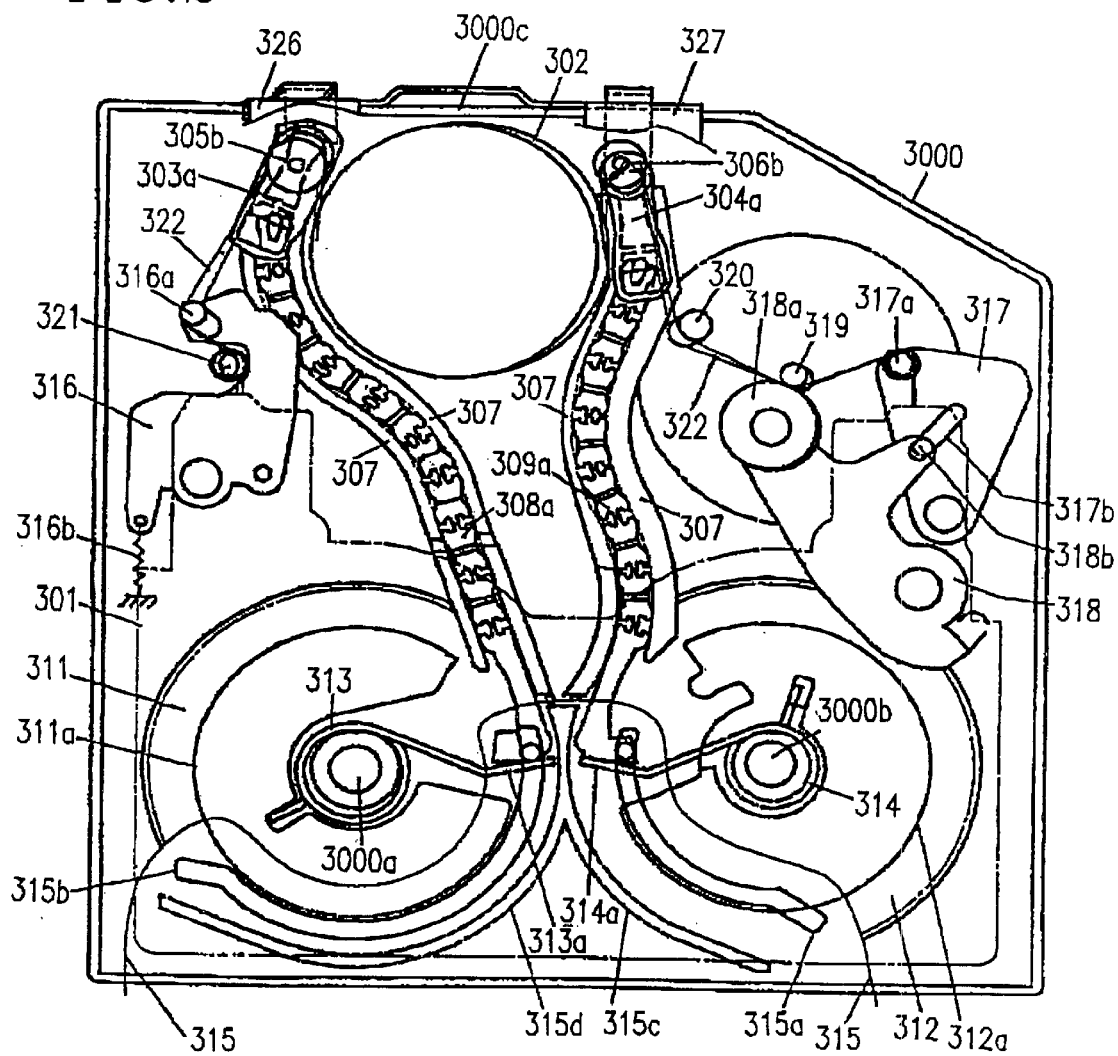
FIG. 2 is a partial plan-view of the tape loading device shown in FIG. 1.

FIG. 1 is a plan view of a tape loading device 1000 according to an example of the present invention in the state where a tape has not been drawn from a tape cassette 301. FIG. 2 is a plan view of the tape loading device 1000 in the state where a magnetic tape 322 (hereinafter, referred to as the "tape 322") is drawn from the tape cassette 301 so as to be wound around a rotational head cylinder 2. With reference to FIGS. 1 and 2, a structure of the tape loading device 1000 will be described.

Fixed (i.e., non-roller) tape guide posts 320 and 321 are provided on a chassis 3000. A capstan motor shaft 319 and a pinch roller 318a hold the magnetic tape 322 therebetween so as to transport the magnetic tape 322.

The pinch roller 318a is provided on a pinch arm 318. The pinch roller 318a is pulled from the position shown in FIG. 1 to the position shown in FIG. 2 by a driving element (not shown) and is put into pressure-contact with the capstan motor shaft 319.

A tape pull-out post 316a projects from a tape pull-out arm 316, and a tape pull-out post 317a projects from a pull-out arm 317. The pull-out arms 316 and 317 are provided on the chassis 3000. The tape pull-out posts 316a and 317a are moved from the position shown in FIG. 1 to the position shown in FIG. 2 respectively by pivoting movements of the pull-out arms 316 and 317 caused by a driving element (not shown), so as to pull out the tape 322. A boss 318b provided on the pinch arm 318 is slidably engaged with a cam groove 317b formed in the pull-out arm 317. The pull-out arm 317 is driven by the movement of the pinch arm 318. A tension spring 316b is attached to the pull-out arm 316 at one end thereof. The other end of the tension spring 316b is fixed, for example, on the chassis 3000.

With reference to FIG. 1, a tape guide roller post 305a projects from a boat 303a (transportation member), and a tape guide roller post 306a projects from a boat 304a (transportation member). The boats 303a and 304a are each guided by a rail 307, and can each reciprocally move by a driving mechanism (described later) between the position shown in FIG. 1 (when the tape 322 is not loaded) and the position shown in FIG. 2 (when the tape 322 is completely loaded).

The positions of the boats 303a and 304a in FIG. 1 will be referred to as the "unloading positions", and the positions of the boats 303a and 304a in FIG. 2 will be referred to as the "loading completion positions". A state in which the tape 322 is mounted on the chassis 3000 is defined as a first state. A state in which the tape guide roller post 305a and 306a pull out the tape 322 and wind the tape 322 at a prescribed position so as to form a tape running path is defined as a second state. An operation for moving from the first state to the second state is defined as a loading operation. An operation for moving from the second state to the first state is defined as an unloading operation.

Due to the above-described structure, the tape 322 is pulled out from the tape cassette 301 and forms a tape path as shown in FIG. 2. The tape 322 is run as shown in FIG. 2 by the capstan motor shaft 319, the pinch roller 318a, and a reel table (not shown), which is engaged with a reel hub (not shown) in the tape cassette 301 for rotating the reel hub by a driving force of the capstan motor shaft 319.

Next, a method for driving the boats 303a and 304a will be described.

Figure 3A:
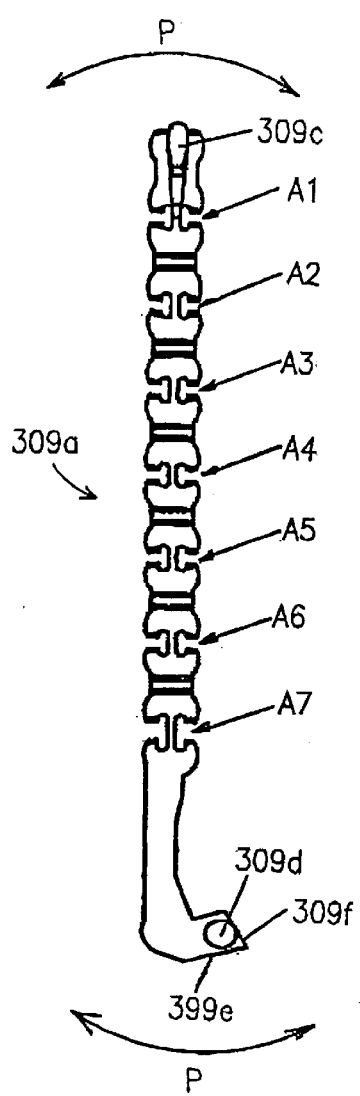
FIG. 3A is an enlarged plan view of a chain-like driving member of the tape loading device shown in FIG. 1.
Figure 3B:
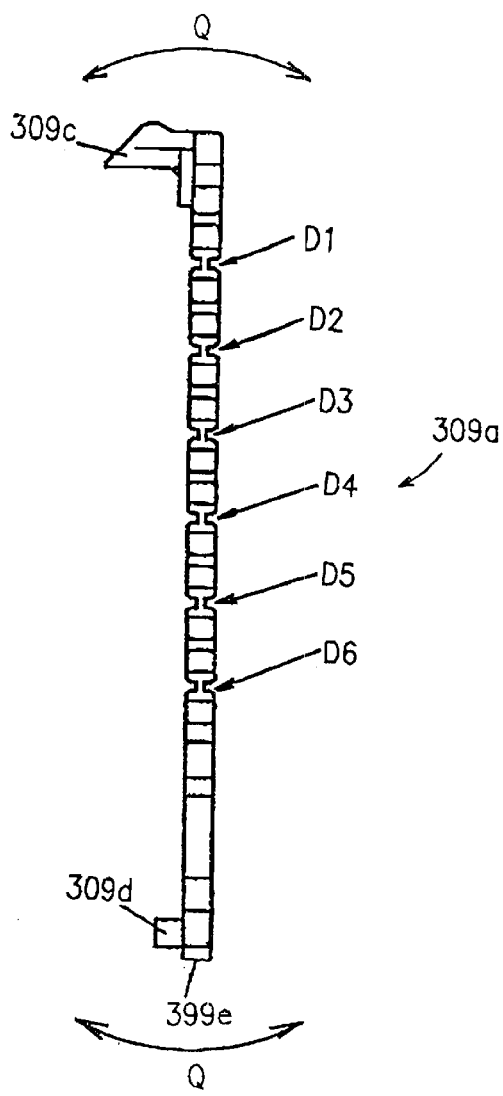
FIG. 3B is an enlarged side view of the chain-like driving member of the tape loading device shown in FIG. 1.

In FIG. 1, reference numerals 308a and 309a each refer to a chain-like driving member. FIG. 3A is an enlarged plan view of the chain-like driving member 309a. FIG. 3B is an enlarged side view thereof. The chain-like driving member 308a is identical with the chain-like driving member 309a, and will not be described in detail. The chain-like driving member 309a includes a plurality of flexures along the entirety thereof, both in the width direction as represented by reference numerals A1 through A7 (FIG. 3A) and in the thickness direction as represented by reference numerals D1 through D6 (FIG.3B). Therefore, the chain-like driving member 309a can freely bend in the direction of arrow P (FIG. 3A), and in the direction of arrow Q (FIG. 3B). The chain-like driving member 309a has a tower-like projection 309a at one end thereof, and has a cylindrical boss 309d at the other end thereof.

The chain-like driving member 309a is identical in principle and construction to the chain-like driving member 308a. Each is made up of a plurality of links which may be formed individually and linked together, or may be integrally joined, e.g., by a "living hinge" arrangement. As a particular example, the chain-like driving members 308a and 309a are formed from molded resin or the like, although it will be appreciated that other types of materials may be used without departing from the scope of the invention.

With reference to FIGS. 4A through 4D, the structure of the boat 304a, the chain-like driving member 309a, and the corresponding rail 307 will be described. The structure of boat 303a, the chain-like driving member 309a, and the corresponding rail 307 is identical therewith, and will not be described in detail for sake of brevity.

Figure 4D:
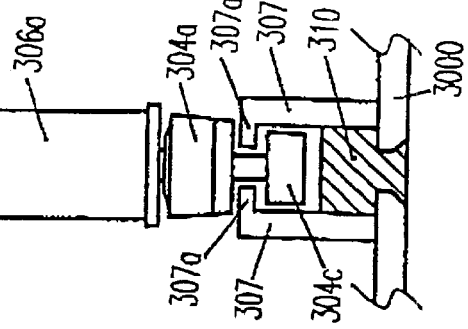
FIG. 4D is a cross-sectional view of FIG. 4B taken along line N—N of FIG. 4B.
Figure 4A:
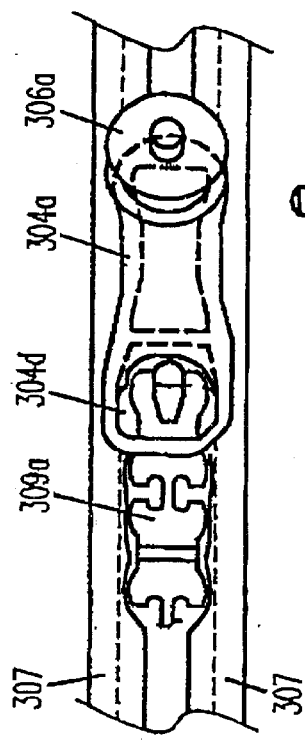
FIG. 4A is an enlarged partial plan view of a rail carrying a boat of the tape loading device shown in FIG. 1.
Figure 4B:
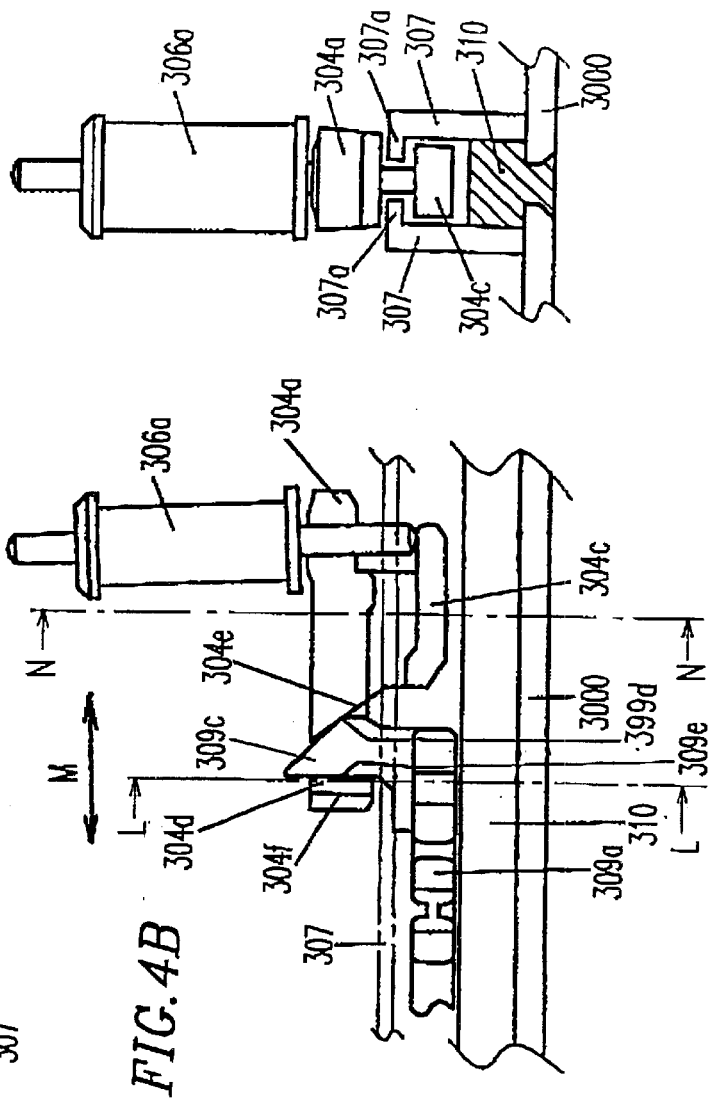
FIG. 4B is a side view of FIG. 4A.
Figure 4C:
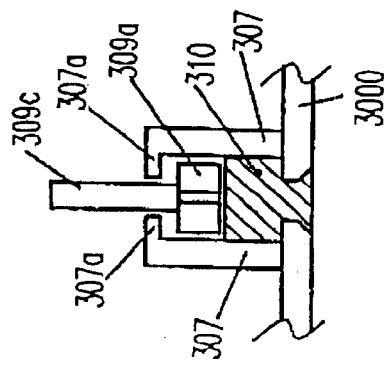
FIG. 4C is a cross-sectional view of FIG. 4B taken along line L—L of FIG. 4B.

FIG. 4A is an enlarged partial plan view of the rail 307 carrying the boat 304a. FIG. 4B is a side view of FIG. 4A. FIG. 4C is cross-sectional view of FIG. 4B taken along line L—L of FIG. 4B. FIG. 4D is a cross-sectional view of FIG. 4B taken along line N—N of FIG. 4B.

The rail 307 is provided from the vicinity of the unloading position of the boat 304a to the loading completion position of the boat 304a with its height changed, so as to cover a slope 310 (see, e.g., FIG. 6C) which is integrally molded with the chassis 3000.

The boat 304a includes a base 304a on an opposite side of rail flanges 307a of the rail 307. Thus, the boat 304a can slide back and forth along the rail 307 in the direction of arrow M.

The chain-like driving member 309a is inserted into a space between the rail 307 and the slope 310, and can also slide in the direction of arrow M. The rail 307 and the slope 310 smoothly meanders laterally and vertically with respect to the chassis 3000. The chain-like driving member 309a is freely bendable laterally and vertically due to the plurality of flexures and thus can smoothly slide between the rail 307 and the slope 310.

The chain-like driving member 309a moves only between the rail 307 and the slope 310. Unlike the conventional structure, there are no spatial restrictions due to a large pivoting movement of the link mechanism. Therefore, the tape loading device 1000 in this example is space saving.

The projection 309a at one end of the chain-like driving member 309a is inserted into a hole 304d (FIGS. 4A and 4B) in a rear portion of the boat 304a with a prescribed gap. Due to this, a front face 399d of the projection 309a and an inclining face 304e of the boat 304a face each other. A rear face 309e of the projection 309c and a face 304f of the boat 304a face each other. The face 304f is disposed rearward with respect to the inclining face 304e. While the tape is being loaded, the front face 399d pushes the inclining face 304e, thereby sliding the boat 304a forward (to the right in FIG. 4B).

The inclining face 304e can be defined as a forward wall, and the face 304f can be defined as a rearward wall. The front face 399d of the projection 309a can be defined as a pressure-contact member.

Returning to FIG. 1, gears 311 and 312 are driven by a driving element (not shown). The gears 311 and 312 are respectively rotatably mounted around shafts 3000a and 3000b, which are integrally molded with the chassis 3000. Coiled is springs 313 and 314 are respectively mounted about the centers of the gears 311 and 312. The coiled springs 313 and 314 integrally pivot with the gears 311 and 312, respectively. A movable end 313a of the coiled spring 313 is stopped by a stopper 311b of the gear 311. A movable end 314a of the coiled spring 314 is stopped by a stopper 312b of the gear 312.

Figure 5A:
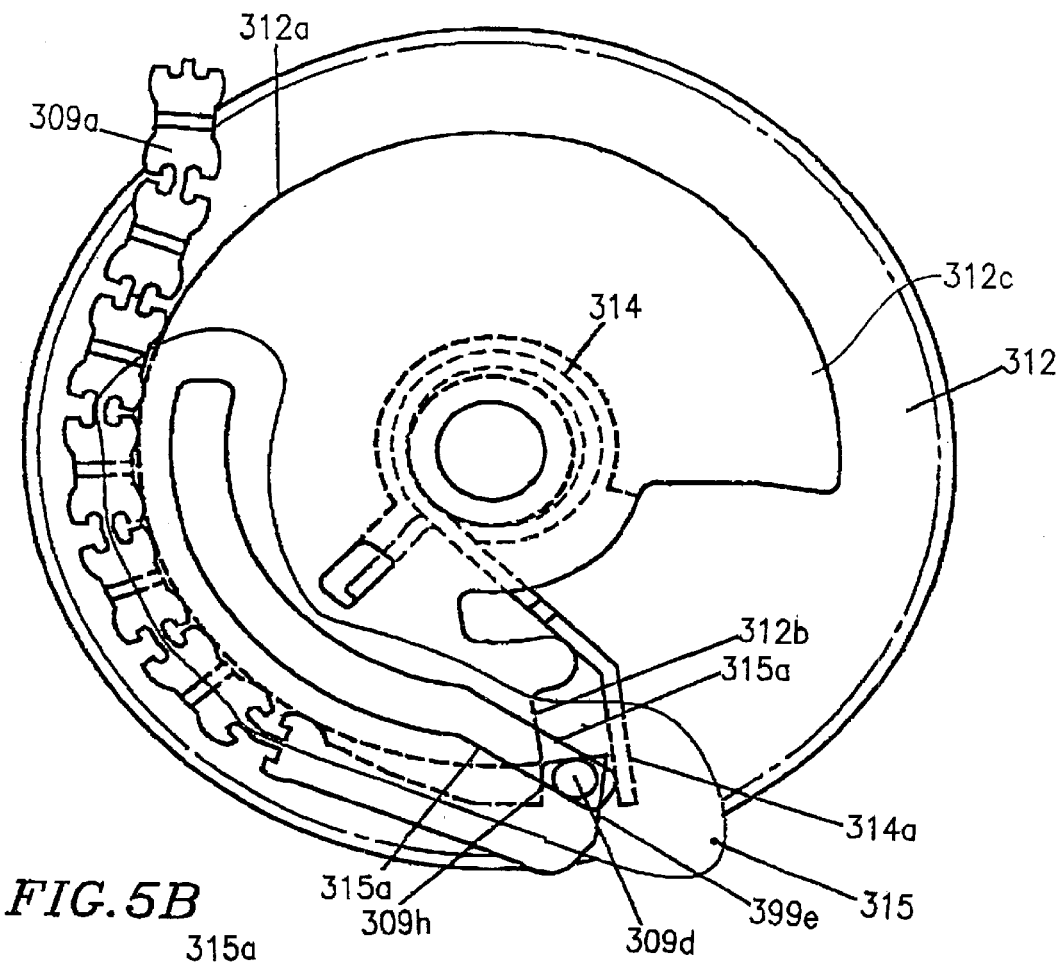
FIG. 5A is an enlarged plan view of a gear of the tape loading device shown in FIG. 1.
Figure 5B:
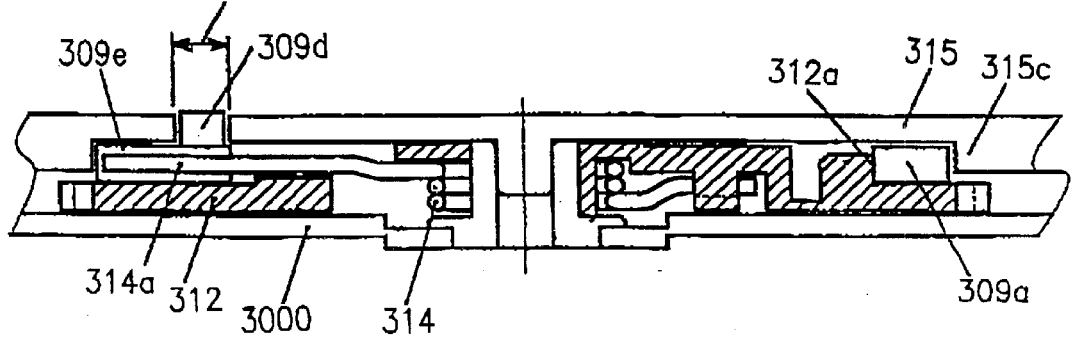
FIG. 5B is a side view of the gear shown in FIG. 5A.

FIG. 5A is an enlarged plan view of the gear 312, and FIG. 5B is a side view thereof with reference to FIGS. 5A and 5B, the structure of the gear 312, the coiled spring 314 and the chain-like driving member 309a will be described. The structure of the gear 311, the coiled spring 313 and the chain-like driving member 308a are identical therewith, and will not be described in detail.

The gear 312 is provided between the chassis 3000 and a pressing plate 315. The chain-like driving member 309a can be wound around an outer circumferential surface 312a of a partially cut-out arc-shaped projection 312c. A guide 315d (FIG. 1) is provided so as to face the circumferential surface 312a with the chain-like driving member 309a interposed therebetween. A guide 315a (FIG. 1) is provided so as to face a circumferential surface 311a of a partially cut-out arc-shaped projection 311a of the gear 311.

The movable end 314a of the coiled spring 314 is at the same height as that of a pressing face 399e of the chain-like driving member 309a so that the movable end 314a can contact the pressing face 399e. The pressing plate 315 has a cam groove 315a, and the boss 309d of the chain-like driving member 309a is slidably engaged within the cam groove 315a.

In FIG. 1, V-shaped stoppers 326 and 327 are provided for positioning the tape guide roller posts 305a and 306a. The V-shaped stoppers 326 and 327 are integrally formed of sheet metal, and are attached to a wall 3000c of the chassis 3000.

Figure 6B:
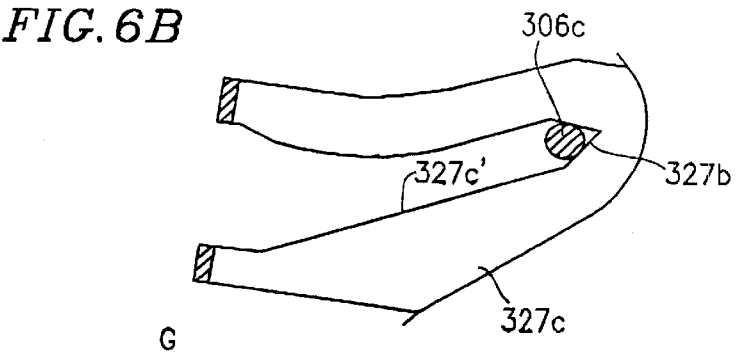
FIG. 6B is a cross-sectional view of FIG. 6A taken along line G—G.
Figure 6A:
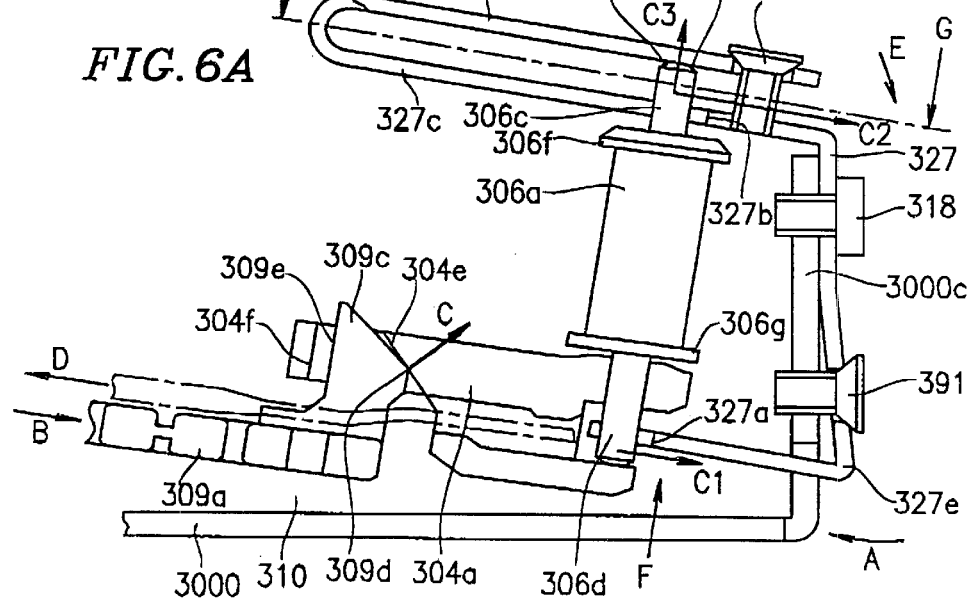
FIG. 6A is a side view of the boat, string-shaped driving member and a V-shaped stopper of the tape loading device shown in FIG. 1.
Figure 6C:
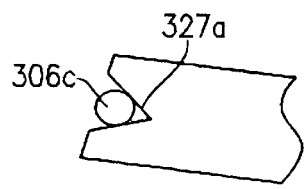
FIG. 6C is a view of FIG. 6A seen in the direction of arrow F.

FIG. 6A is a side view of the boat 304a, the string-shaped driving member 309a and the V-shaped stopper 327, in the state where the tape guide roller post 306a is in pressure-contact with the V-shaped stopper 327. FIG. 6B is a cross-sectional view of FIG. 6A taken along line G—G. FIG. 6C is a partial view of FIG. 6A seen in the direction of arrow F. With reference to FIGS. 6A through 6C, the structure and function of the V-shaped stopper 327 will be described. The V-shaped stopper 326 has an identical structure function therewith, and will not be described in detail.

The tape guide roller post 306a includes a roller shaft having an upper portion 306c which projects upward from an upper flange 306f, and a lower portion 306d which projects downward from a lower flange 306g. A roller is supported by the roller shaft between the flanges. The upper portion 306c has a top surface 306e. The V-shaped stopper 327 includes an upper portion 327c, a lower portion 327e, and a ceiling portion 327g. The lower portion 327e includes a lower V-shaped portion 327a for positioning the lower portion 306d of the tape guide roller post 306a. The upper portion 327c includes an upper V-shaped portion 327b for positioning the upper portion 306a of the tape guide roller post 306a. The ceiling portion 327g includes a ceiling portion 327d for positioning the top surface 306e of the tape guide roller post 306a. An attaching screw 318 attaches the V-shaped stopper 327 to the chassis 3000. The V-shaped stopper 327 is elastically bendable. The ceiling portion 327g is bent in the direction of arrow E and secured in that state by a screw 392. The lower portion 327e is bent in the direction of arrow A and secured in that state by a screw 391. By rotating the screw 392, the height of the ceiling portion 372g can be adjusted relative to the upper portion 327a. By rotating the screw 391, the position of the lower portion 327a in the direction of arrow A can be adjusted.

An operation of the tape loading device 1000 having the above-described structure will be described with reference to FIGS. 7 through 11.

Figure 7:
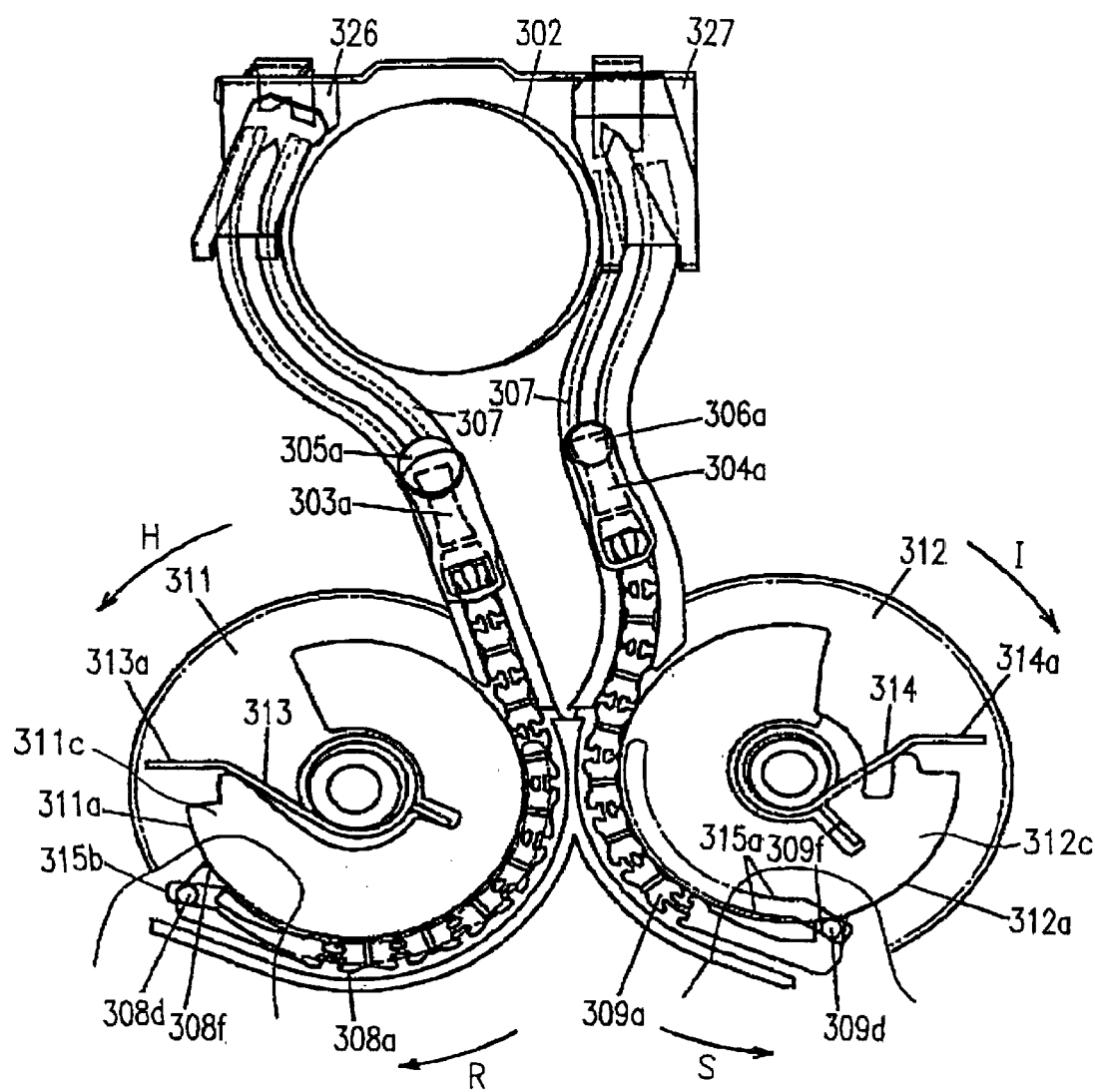
FIGS. 7 through 11 are plan views of the tape loading device shown in FIG. 1, illustrating a loading operation and an unloading operation performed by the tape loading device.

FIG. 7 shows the state where unloading is completed. In this state, each roller posts 305a and 306a are in the opening of the tape cassette (not shown).

From this state, the gears 311 and 312 are rotated by a driving element (not shown) in the direction of arrows H and I so as to start loading. In this state, however, the bosses 308d and 309d of the chain-like driving members 308a and 309a are guided by linear sections of the cam grooves 315b and 315a, and also the faces 308f and 309f of the chain-like driving members 308a and 309a contact outer circumferential surfaces 311a and 312a of the arc-shaped projections 311c and 312c of the gears 311 and 312. Therefore, the chain-like driving members 308a and 309a do not rotate with the gears 311 and 312, and thus the boats 303a and 304a do not move.

Figure 8:
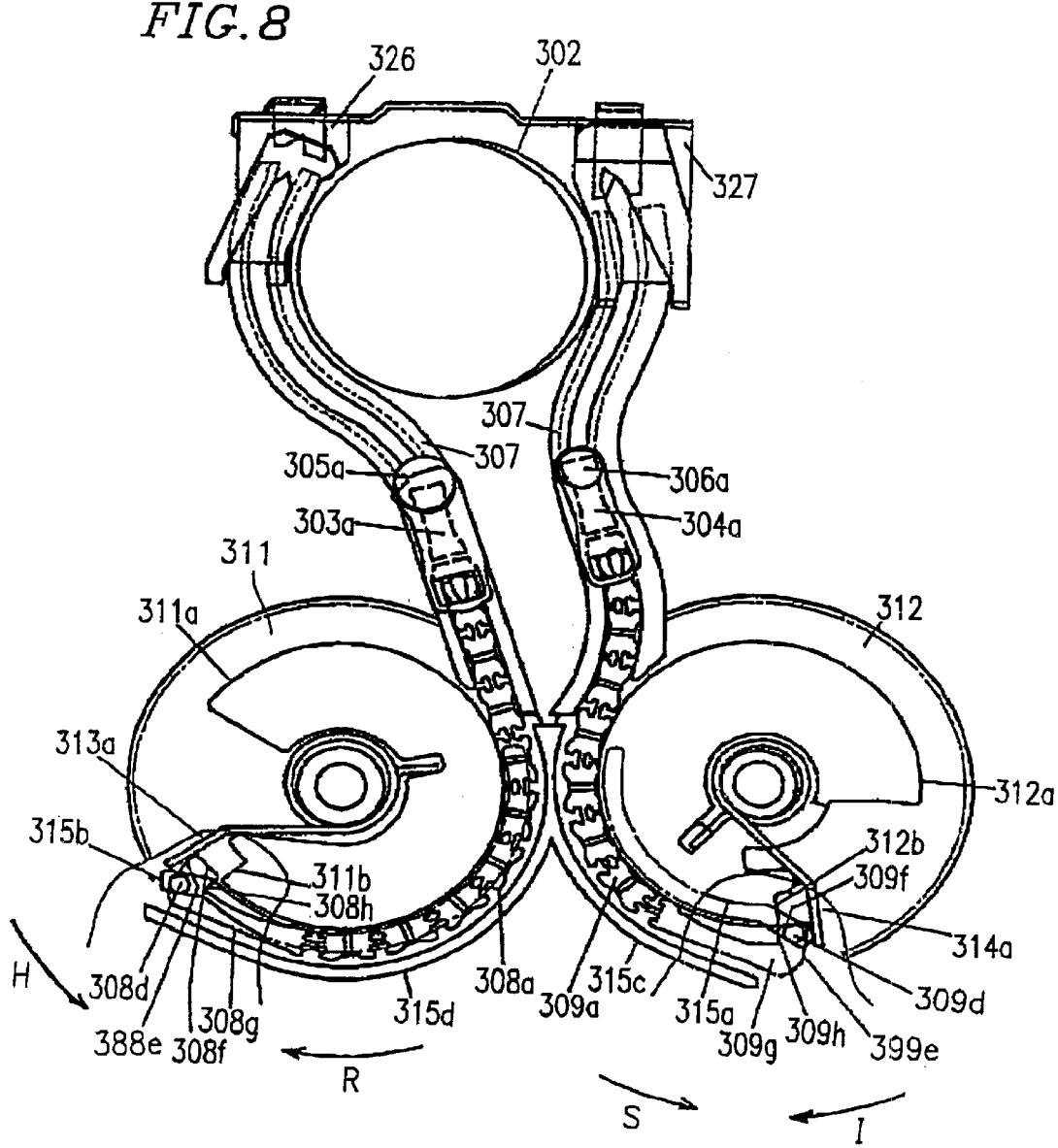

FIG. 8 shows the state where the gears 311 and 312 further rotate, and the boat 303a and 304a start loading.

In this state, the movable ends 313a and 314a of the coiled springs 313 and 314 integrally rotatable with the gears 311 and 312 contact the pressing faces 388e and 399e of the chain-like driving members 308a and 309a, and thus presses the chain-like driving members 308a and 309a in the directions of arrows H and I. In this state, the relative position between the chain-like driving members 308a and 309a and the gears 311 and 312 is changed, so that the faces 308f and 309f of the chain-like driving members 308a and 309a respectively face the cut-out portions of the arc-shaped projections 311c and 312c of the gears 311 and 312. Accordingly, as the gears 311 and 312 rotate, the bosses 308d and 309d are guided along the cam grooves 315b and 315a to go inside the gears 311 and 312, as shown in FIG. 9.

Figure 9:
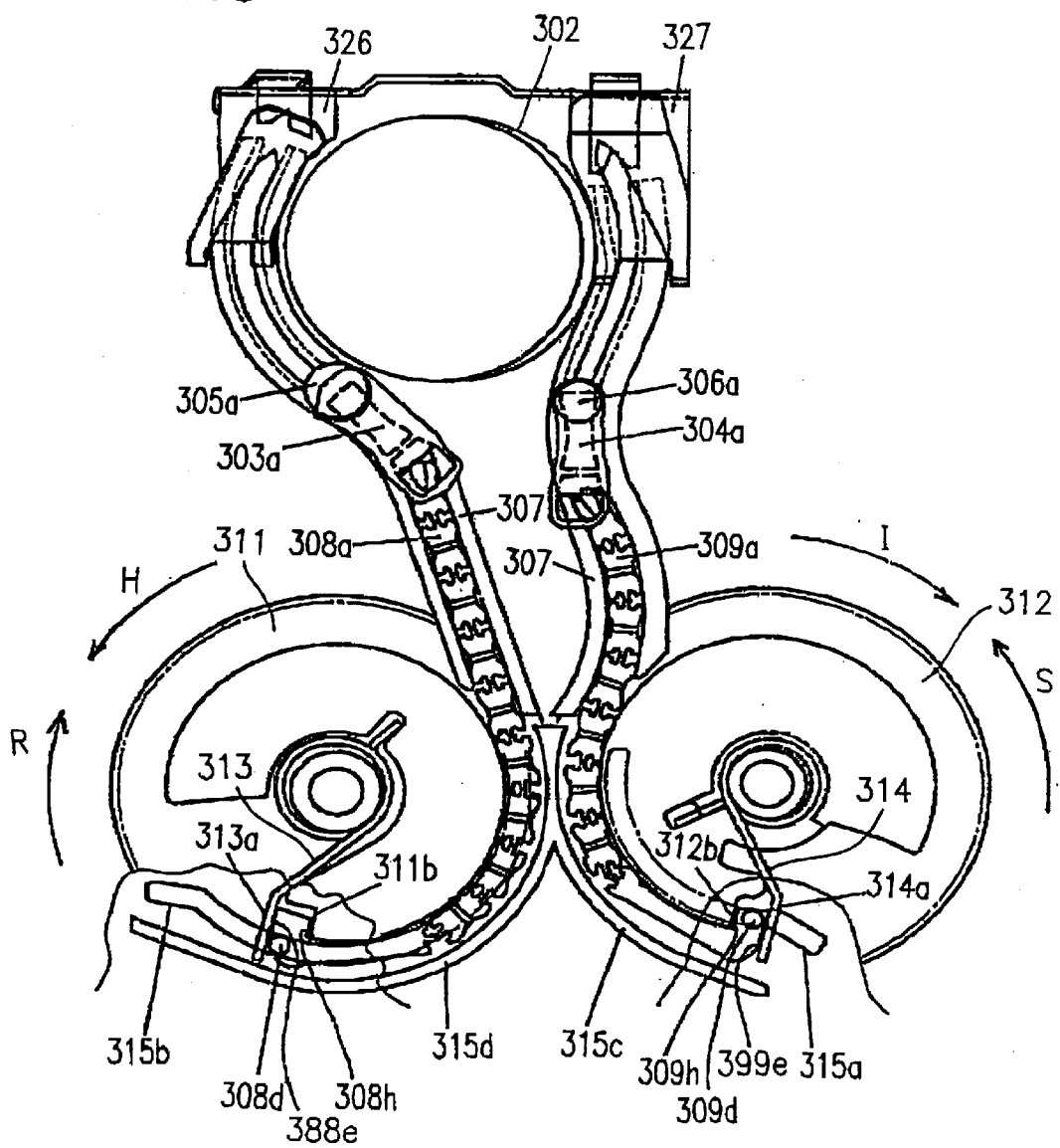

In FIG. 9, the boats 303a and 304a are being moved.

The coiled springs 313 and 314 press the pressing faces 388e and 399e, and the stoppers 311b and 312b face the engaging surfaces 308h and 309h of the chain-like driving members 308a and 309a. The bosses 308d and 309d are in engagement with arc-shaped portions of the cam grooves 315b and 315a, which are concentric with the gears 311 and 312, The arc-shaped guides 315d and 315a for guiding the chain-like driving members 308a and 309a are provided outside the chain-like driving members 308a and 309a. Therefore, the chain-like driving members 308a and 309a move in the directions of arrows H and I together with the gears 311 and 312 but are not diverted outside.

The chain-like driving members 308a and 309a move while being guided by the slopes 310 between the rails 307 and the chassis 3000, and thus drive the boats 303a and 304a to load the tape (not shown). As shown in FIGS. 4A through 4D, the front face 399d (in the case of the chain-like driving member 309a, for example) presses the inclining face 304e, thereby sliding the boat 304a to the right (in FIG. 4B) along the rail 307.

Figure 10:
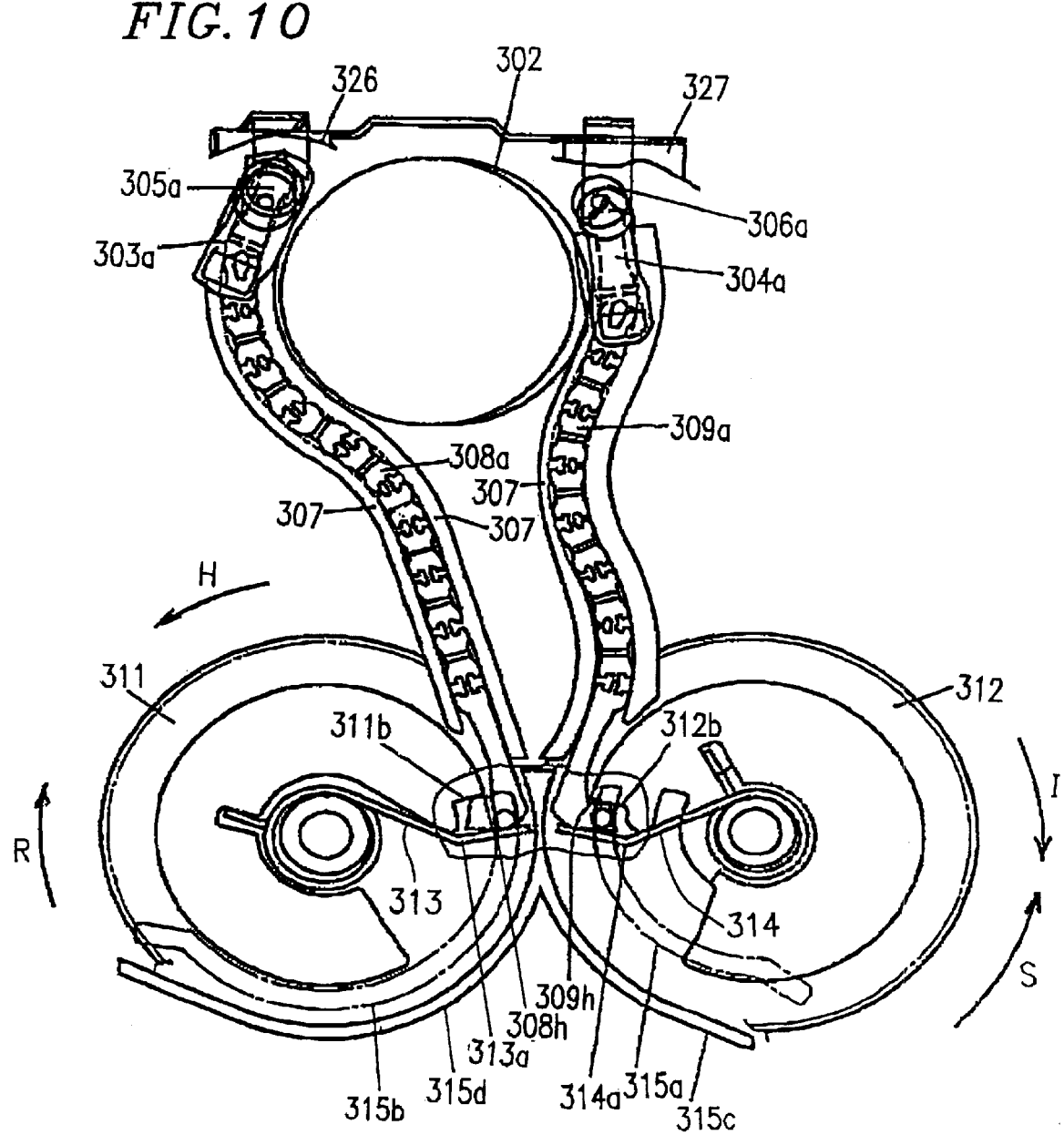

FIG. 10 shows the state of the tape guide roller posts 305a and 306a, the boats 303a and 304a, and the chain-like driving members 308a and 309a in the state where the tape guide roller posts 305a and 306a contact the V-shaped stoppers 326 and 327.

In this state, the tape (not shown) is wound around the rotational head cylinder 302. The tape guide roller posts 305a and 306a contact the V-stoppers 326 and 327 as shown in enlarged view of FIG. 6A.

In FIG. 10, the stoppers 311b and 312b of the gears 311 and 312 still face the engaging surfaces 308h and 309h of the chain-like driving members 308a and 309a.

Figure 11:
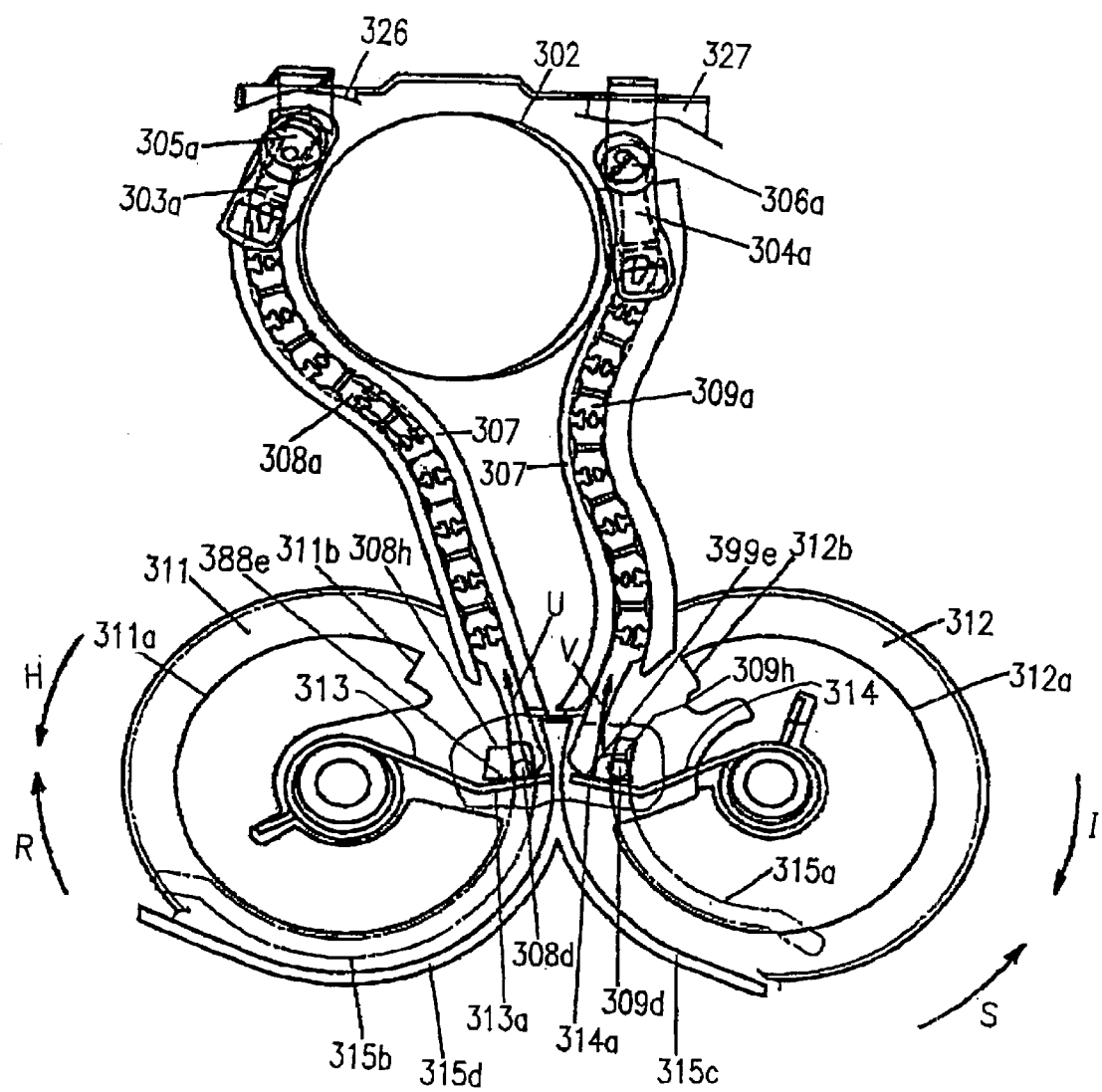
Figure 12:
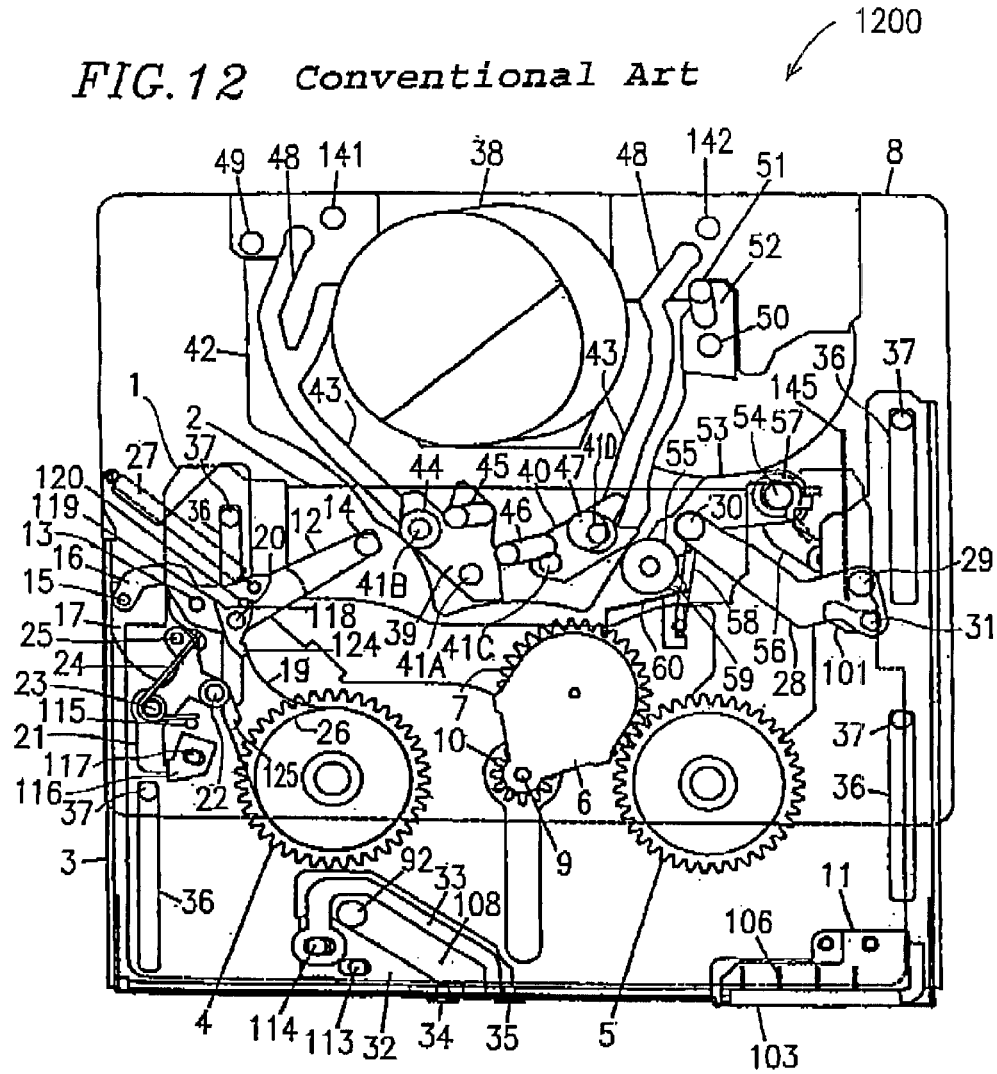
FIG. 12 is a plan view of a conventional magnetic recording and reproduction apparatus.
Figure 13:
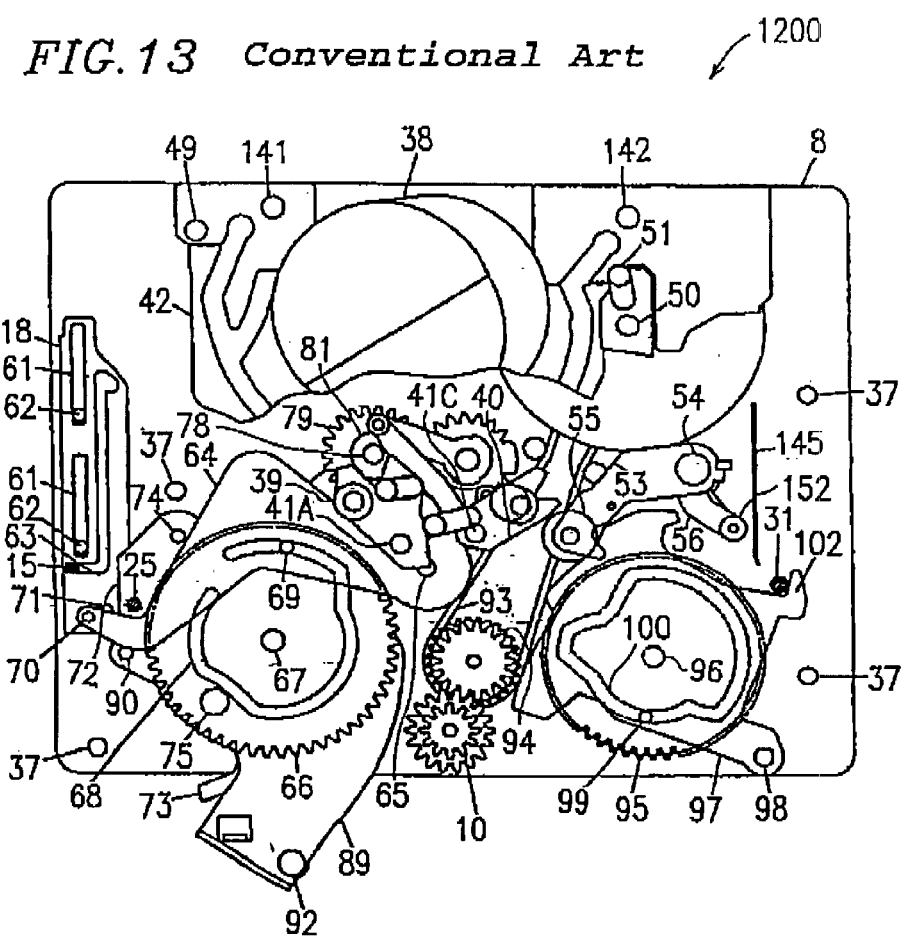
FIG. 13 is a partial plan view of the conventional magnetic recording and reproduction apparatus shown in FIG. 12.
Figure 14:
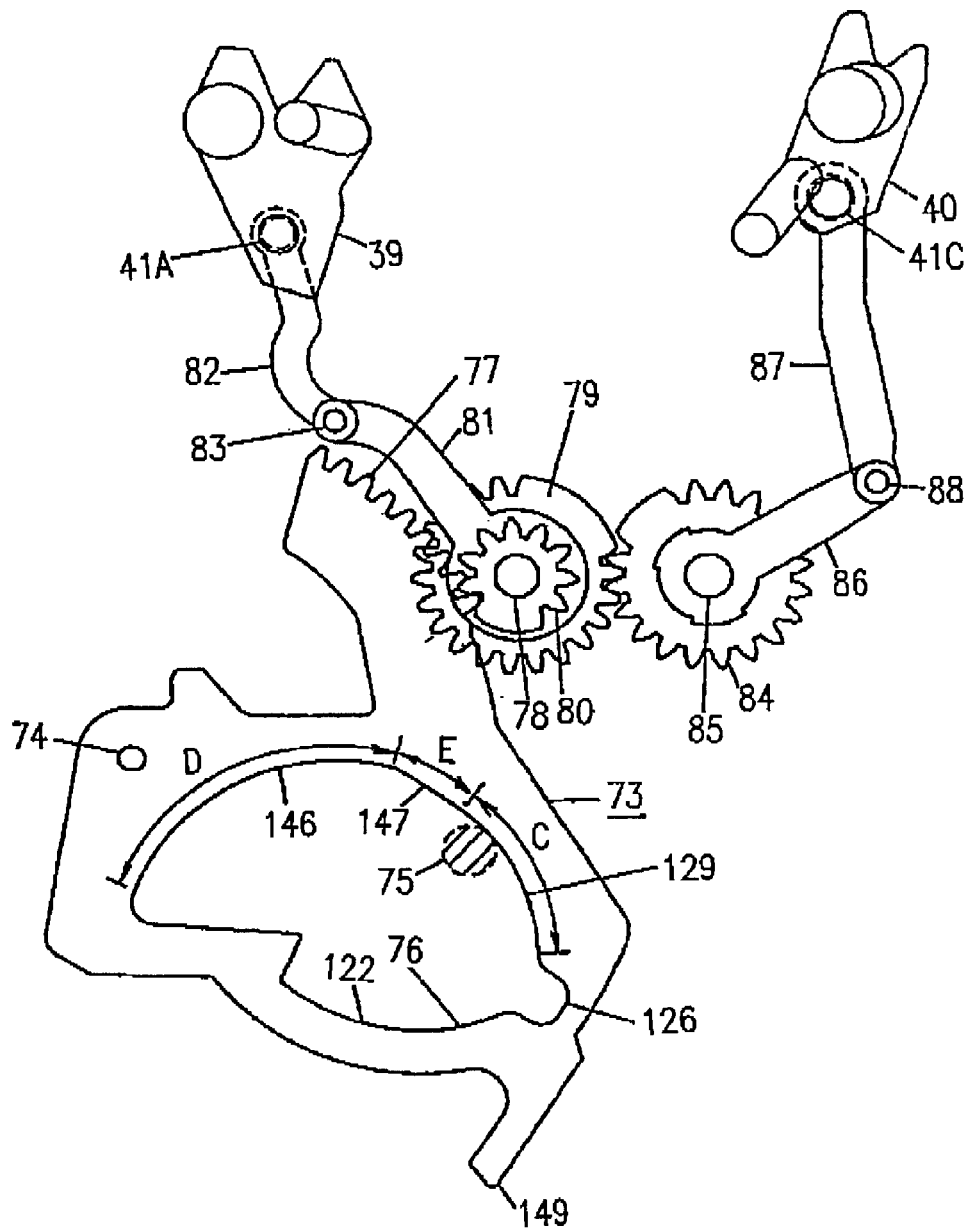
FIG. 14 is an enlarged view of boats of the conventional magnetic recording and reproduction apparatus shown in FIG. 12.
Figure 15:
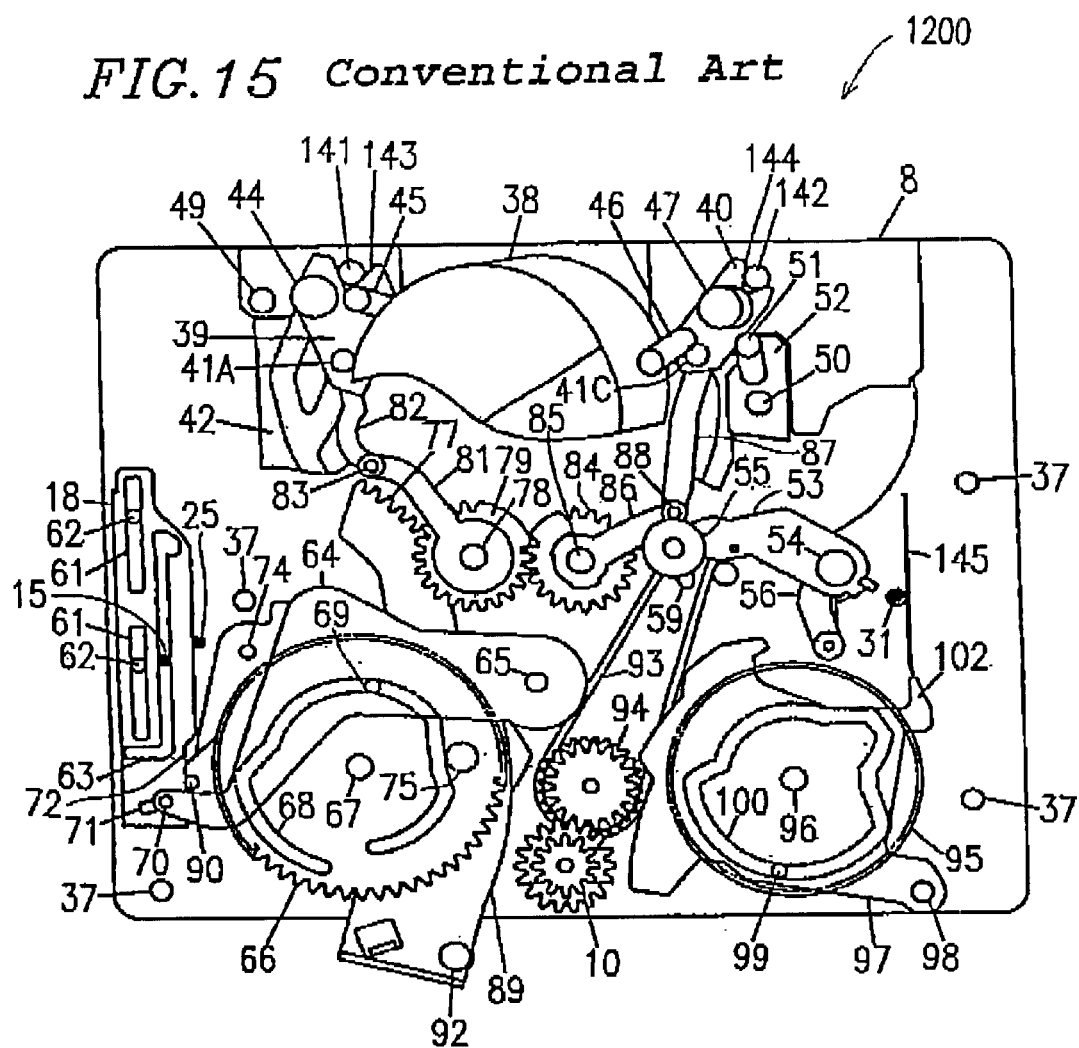
FIG. 15 is a plan view of the conventional magnetic recording and reproduction apparatus shown in FIG. 12 when a tape 2 is loaded.
Figure 16:
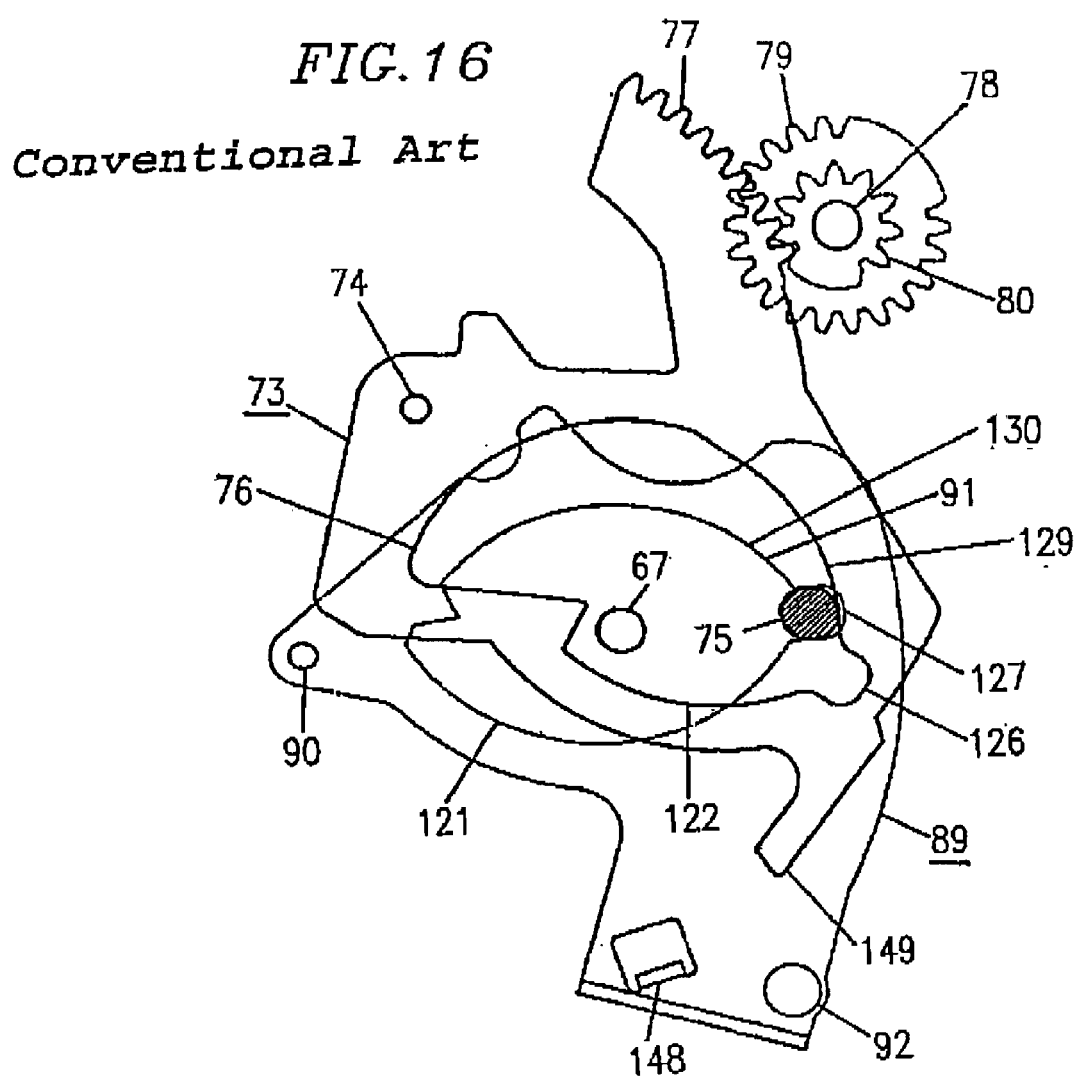
FIG. 16 is a boat driving arm of the conventional magnetic recording and reproduction apparatus shown in FIG. 12 when the tape is loaded.
Figure 18A:
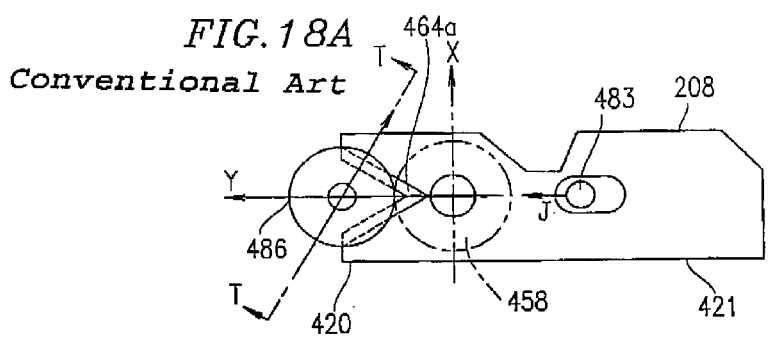
FIGS. 18A through 18D show a positioning mechanism for positioning a boat in the conventional magnetic recording and reproduction apparatus shown in FIG. 17.
Figure 18B:
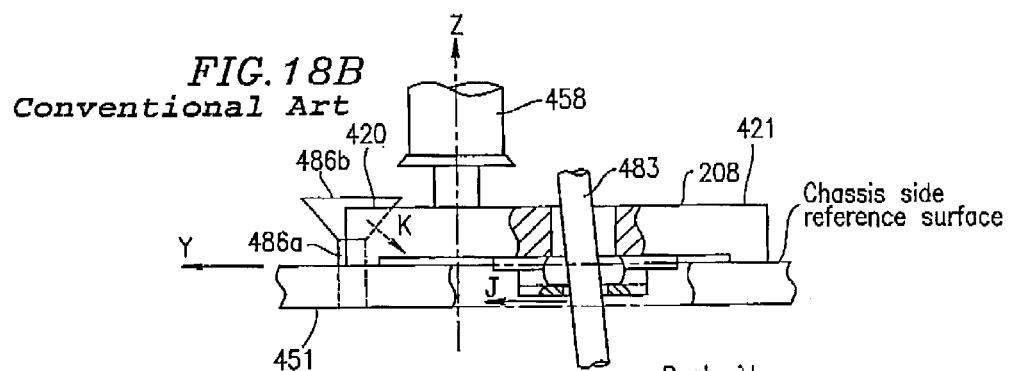
Figure 18C:
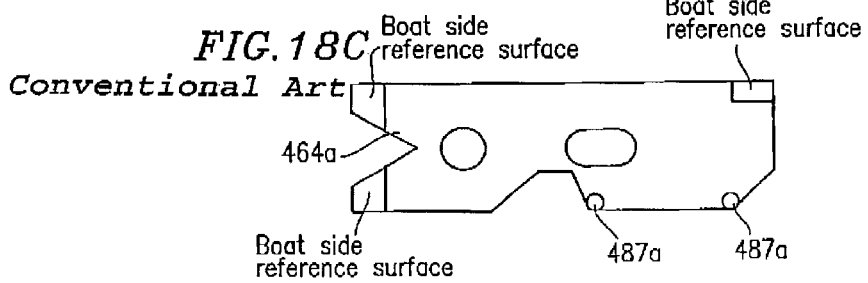
Figure 18D:

FIG. 11 shows the state where the gears 311 and 312 further rotate in the directions of arrows H and I. The coiled springs 313 and 314 are bent. The reason is that since the tape guide roller posts 305a and 306a contact the V-shaped stoppers 326 and 327, the boats 303a and 304a and the chain-like driving members 308a and 309a do not move.

In FIG. 11, the coiled springs 313 and 314 respectively apply forces in the directions of arrows U and V to the chain-like driving members 308a and 309a. The chain-like driving members 308a and 309a, which are freely bendable, tend to slide along the rails 307 and the slopes 310. Thus, the chain-like driving members 308a and 309a convey the forces in the directions of arrows U and V to the boats 303a and 304a, so as to put the tape guide roller posts 305a and 306a into pressure-contact with the V-shaped stoppers 326 and 327.

The pressure-contact mechanism will be described with reference to FIG. 6A. FIG. 6A is a side view of the boat 304a, the chain-like driving member 309a and the V-shaped stopper 327 in the state shown in FIG. 11. A force V (FIG. 11) conveyed to the chain-like driving member 309a by the coiled spring 314 urges the chain-like driving member 309a in the direction of arrow B shown in FIG. 6A. The tower-like projection 309c of the chain-Like driving member 309a contacts the inclining face 304e and thus urges the boat 304a in the direction of arrow C shown in FIG. 6A.

In this state, the lower portion 306d of the tape guide roller post 306a contacts the lower V-shaped portion 327a of the V-shaped groove 327. The upper portion 306c of the tape guide roller post 306a is guided along guides 327c of the upper portion 327c and contacts the upper V-shaped portion 327b. The top surface 306e of the tape guide roller post 306a is guided along the ceiling portion 327g and contacts the ceiling portion 327d. The lower portion 306d is pressured in the direction of arrow C1. The upper portion 306c is pressured in the direction of arrow C2. The top surface 306e is pressured in the direction of arrow C3. Thus, the tape guide roller post 306a is positioned at a prescribed angle and height. In this manner, the tape loading is completed As described above, the V-shaped stopper 327 is adjusted to be ideally positioned in the directions of arrows A and E by the screws 391 and 392. The center shaft of the tape guide roller post 306a is directly put into pressure-contact with the lower V-shaped portion 327a, the upper V-shaped portion 327b and the ceiling portion 327d with no other element interposed therebetween. Therefore, the tape guide roller post 306a can be positioned with a very high level of precision. Therefore, the tape can be wound around the rotational head cylinder 302 in an ideal state.

The tape is unloaded as follows. When the gears 311 and 312 rotate in the directions of arrows R and S, the coiled springs 313 and 314 return to the state shown in FIG. 10, where the coiled springs 313 and 314 are more relaxed. In FIG. 10, the stoppers 311b and 312b of the gears 311 and 312 are engaged with the engaging surfaces 308h and 309h and thus pull the chain-like driving members 308a and 309a in the directions of arrows R and S. The rear face 309e of the chain-like driving member 309a, (FIG. 6A) contacts the face 304f of the boat 304a, and thus drives the boat 304a in the direction of arrow D (FIG. 6A).

Thus, the boats 303a and 304a are unloaded from the state of FIG. 10 to the state shown in FIG. 9 and then to the state shown in FIG. 8. In the state shown in FIG. 8, the roller posts 305a and 306a are accommodated in the opening of the tape cassette (not shown). In this state, the bosses 308d and 309d of the chain-like driving members 308a and 309a are guided by the cam grooves 315b and 315a, and the chain-like driving members 308a and 309a are pulled outside of the gears 311 and 312. The stopper 311b and 312b are disengaged from the engaging surfaces 308h and 309h, and thus the chain-like driving members 308a and 309a are disassociated from the rotation of the gears 311 and 312. Accordingly, the gears 311 and 312 can be further rotated in the directions of arrows R and S. In a magnetic recording and reproduction apparatus, after the roller posts 305a and 306a return to the positions in the opening of the tape cassette, the tape needs to be detached by, for example, lifting the cassette lifting device. This operation can be performed by using the above-mentioned further rotation of the gears 311 and 312. Thus, the magnetic recording and reproduction apparatus 1000 is put into the state shown in FIG. 7. The unloading of the tape is completed.

As described above, In this example of the present invention, the inclining face 304e is disposed in a rear portion of the boat 304a having the roller post 306a projecting therefrom. The normal to the inclining surface 304e is directed forward and obliquely upward. During the loading operation, the chain-like driving member 309a presses the inclining face 304e, thereby transporting the boat 304a forward (to the right in FIG. 4B). During the unloading operation, the chain-like driving member 309a presses the face 304f disposed rearward to the inclining face 304e, thereby transporting the boat 304a rearward (to the left in FIG. 4B). When the loading is completed, the inclining face 304e is pressed so as to put the roller post 306a into contact the V-shaped stopper 327 to position the roller post 306a. In this manner, the loading operation of the magnetic tape can be performed by a simple structure. Thus, a lower-cost tape loading device having a small number of elements is provided.

When the loading operation is completed, an upper portion of each of the tape guide roller posts 305a and 306a is in engagement with the upper stopping member. A lower portion of each tape guide roller post, 305a, 306a or a portion of each boat 303a, 304a is in engagement with the lower stopping member. A portion of each tape guide roller post 305a, 306a or a portion of each boat 303a, 304a is in engagement with the height stopping member. Thus, the position of each tape guide roller post 305a, 306a both in the planar direction and the height direction is determined. Therefore, neither the size of each boat 303a, 304a nor the angle of inclination of the tape guide roller post 305a, 306a with respect to the boat 303a, 304a influences the precision of inclination of the tape guide roller post 305a, 306a. The tape guide roller post 305a, 306a can be set to a prescribed angle with a high level of precision with low-cost elements, without requiring the size of the boat 303a, 304a or the angle of inclination of the tape guide roller post 305a, 306a with respect to the boat 303a, 304a to be extremely precise. Therefore, a low-cost, high performance tape loading device is provided.

Especially in the case of the above-described example where the upper portion and the lower portion of the tape guide roller post 305, 306a are respectively positioned by the upper and lower stopping members, and the top surface of the tape guide roller post 305a, 306a is positioned by the height stopping member, there is no element disposed between the stopping members and the tape guide roller post 305a, 306a. Therefore, the tape guide roller post 305a, 306a can be set at a prescribed angle with a higher level of precision. A lower-cost, higher performance tape loading device is provided, As described above, the present invention provides a low-cost and high performance tape loading device for performing loading and unloading operations and positioning tape guide posts, with a small number of elements with a simple structure.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tape loading device for loading a tape from a first state, in which the tape is mounted on a chassis, to a second state, in which a tape running path is formed as a result of a tape guide post pulling out and winding the tape at a prescribed position, the tape loading device comprising:

a transportation member having the tape guide post thereon;

a forward wall integrated with the transportation member and disposed rearward to the tape guide post and inclined so that normal thereto is directed forward and obliquely upward; and a pressure-contact member, which is in pressure-contact with the forward wall in the second state, for urging the transportation member forward and obliquely upward.

2. A tape loading device according to claim 1 further comprising a rear wall integrated with the transportation member and provided rearward to the forward wall, wherein during a loading operation for transferring from the first state into the second state, the pressure-contact member presses the forward wall to drive the transportation member forward, and during an unloading operation for transferring from the second state into the first state, the pressure-contact member presses the rear wall to drive the transportation member rearward.

3. A tape loading device according to claim 1, further comprising:

an upper stopping member provided above the tape;

a lower stopping member provided below the tape; and a height stopping member, wherein in the second state, an upper portion of the tape guide post contacts the upper stopping member so as to determine a position of the upper portion of the tape guide post in a planar direction, a lower portion of the tape guide post or a portion of the transportation member contacts the lower stopping member so as to determine a position of the lower portion of the tape guide post in the planar direction, and a portion of the tape guide post or a portion of the transportation member contacts the height stopping member so as to determine a position of the tape guide post in a height direction.

4. A tape loading device according to claim 3, wherein the tape guide post includes:

a roller shaft;

a roller rotatably supported by the roller shaft;

an upper flange integrated with the roller shaft for restricting an upward movement of the roller;

a lower flange integrated with the roller shaft for restricting a downward movement of the roller, wherein a portion of the roller shaft which passes through the upper flange and projects upward from the upper flange is defined as an upper roller shaft portion, and a portion of the roller shaft which passes through the lower flange and projects downward from the lower flange is defined as a lower roller shaft portion, the upper roller shaft portion contacts the upper stopping member, the lower roller shaft portion contacts the lower stopping member, and a top surface of the upper roller shaft portion contacts the height stopping member.

* * * * *